(12) United States Patent
Mori et al.

(10) Patent No.: US 8,583,328 B2
(45) Date of Patent: Nov. 12, 2013

(54) REAR WHEEL TOE ANGLE CONTROL DEVICE AND METHOD FOR CALIBRATING A REFERENCE POSITION OF AN ELECTRIC ACTUATOR IN A REAR WHEEL TOE ANGLE CONTROL DEVICE

(75) Inventors: Miki Mori, Wako (JP); Yutaka Horiuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 254 days.

(21) Appl. No.: 13/319,227

(22) PCT Filed: Apr. 27, 2010

(86) PCT No.: PCT/JP2010/003009
§ 371 (c)(1),
(2), (4) Date: Nov. 7, 2011

(87) PCT Pub. No.: WO2010/128585
PCT Pub. Date: Nov. 11, 2010

(65) Prior Publication Data
US 2012/0059552 A1    Mar. 8, 2012

(30) Foreign Application Priority Data
May 8, 2009    (JP) ................... 2009-113208

(51) Int. Cl.
*B62D 11/00*    (2006.01)
*B62D 12/00*    (2006.01)

(52) U.S. Cl.
USPC ......... 701/42; 280/86.75; 280/5.522; 701/41; 700/279

(58) Field of Classification Search
USPC ............. 701/41–42, 49; 280/5.5, 5.522, 5.51, 280/5.52, 86.75, 86.758; 700/279
See application file for complete search history.

(56) References Cited

U.S. PATENT DOCUMENTS 3,187,440 A * 6/1965 Erickson et al. ........... 33/203.13
5,098,116 A * 3/1992 Edahiro et al. ............. 280/5.524
(Continued)

FOREIGN PATENT DOCUMENTS

DE    60023606 E  * 12/2005
EP    1069399 B1 * 11/2005
(Continued)

OTHER PUBLICATIONS

Influence of Front Double Wishbone Independent Suspension Performance on Front Rubber Bushing Stiffness of Lower Control Arm; Liu Xintian; Huang Hu; Wang Jichang; Zhao Lihui; Guo Hui; Wang Yansong; Measuring Technology and Mechatronics Automation (ICMTMA), 2010 International Conference on; vol. 2; Digital Object Identifier: 10.1109/ICMTMA.*

(Continued)

*Primary Examiner* — Cuong H Nguyen
(74) *Attorney, Agent, or Firm* — Rankin, Hill & Clark LLP (57) ABSTRACT

[TASK]
The wheel alignment of rear wheels can be properly set without using an alignment tester if the rear wheels are equipped with a rear wheel toe angle control device.
[SOLUTION]
In a calibration drive control, an ECU (12) actuates electric actuators (11) until the front wheel steering angle ($\delta f$) becomes zero or the rear wheel toe angles ($\delta r$) are symmetric to each other (steps S3 and D4) to thereby achieve a symmetric toe angle position (Ssym) (step S5). Then, the ECU (12) actuates the electric actuators (11) from the symmetric toe angle position (Ssym) by a same amount so as to cause the rear wheel toe angles to be a neutral value, and a reference position (S0) to be substantially equal to a standard operational position (Sstd) or an axial force (AF) to be substantially equal to a standard axial force (AFstd) (step S7). At this time, the operational position detected value (Sdtc) may be reset as the reference position (S0) (step S10).

4 Claims, 7 Drawing Sheets

(56) References Cited

U.S. PATENT DOCUMENTS

| | | | | |
|---|---|---|---|---|
| 6,460,259 | B1 * | 10/2002 | Naruse | 33/203.14 |
| 6,962,355 | B2 * | 11/2005 | Kwon | 280/86.75 |
| 6,962,356 | B2 * | 11/2005 | Kwon | 280/86.75 |
| 7,766,344 | B2 * | 8/2010 | Buma | 280/5.511 |
| 7,798,498 | B2 * | 9/2010 | Buma | 280/5.511 |
| 7,873,440 | B2 * | 1/2011 | Horiuchi et al. | 700/279 |
| 7,896,360 | B2 * | 3/2011 | Buma | 280/5.511 |
| 2003/0209866 | A1 * | 11/2003 | Kwon | 280/5.522 |
| 2003/0209869 | A1 * | 11/2003 | Kwon | 280/86.75 |
| 2007/0290473 | A1 * | 12/2007 | Buma | 280/124.106 |
| 2009/0008887 | A1 * | 1/2009 | Buma | 280/5.511 |

FOREIGN PATENT DOCUMENTS

| | | | |
|---|---|---|---|
| EP | 1986873 A1 | * | 11/2008 |
| JP | 9030438 | | 2/1997 |
| JP | 2001030945 A | * | 2/2001 |
| JP | 2007210456 A | * | 8/2007 |
| JP | 2008-164017 | | 7/2008 |
| KR | 2008083708 A | * | 9/2008 |
| WO | WO 2007091666 A1 | * | 8/2007 |

OTHER PUBLICATIONS

Modelling and dynamic simulation of braking stability in asymmetry chassis; Pang ShuYi ; Guan Xin ; Yang DeJun; Electric Information and Control Engineering (ICEICE), 2011 International Conference on; Digital Object Identifier: 10.1109/ICEICE.2011.5777031; Publication Year: 2011 , pp. 2358-2362.*

* cited by examiner

REAR WHEEL TOE ANGLE CONTROL DEVICE AND METHOD FOR CALIBRATING A REFERENCE POSITION OF AN ELECTRIC ACTUATOR IN A REAR WHEEL TOE ANGLE CONTROL DEVICE

TECHNICAL FIELD

The present invention relates to a rear wheel toe angle control device for variably controlling the toe angle of rear wheels and a method for calibrating a reference position of a linear electric actuator thereof, and in particular to a technology for eliminating a deviation between the detected value of the rear wheel toe angle as detected by a sensor and the actual rear wheel toe angle.

BACKGROUND OF THE INVENTION

In recent years, various vehicles equipped with a rear wheel toe angle control device have been developed for the purpose of enabling the vehicle to quickly change the heading thereof and improving the driving stability of the vehicle by appropriately varying the rear wheel toe angle. According to a known rear wheel toe angle control device, a linear electric actuator including an electric motor and a feed screw mechanism is connected between the knuckle of each rear wheel suspension and the vehicle body so that the toe angles of the rear wheels may be individually varied by extending and retracting the electric actuators. See Patent documents 1 and 2, for instance.

The fuel mileage of a vehicle decreases with the increase in the rolling resistance of the wheels. The rolling resistance depends on the tread pattern and the material of the tire, but is known to significantly increase when the wheel alignment including the toe angle deviates from a proper setting. Therefore, the wheel alignment is properly set before the vehicle leaves the manufacturing plant.

PRIOR ART DOCUMENT(S)

Patent Document(s)

Patent document 1: JP 09-030438
Patent document 1: JP 2008-164017

BRIEF SUMMARY OF THE INVENTION

In the case of a vehicle equipped with a rear wheel toe angle control device, the rear wheel alignment is more susceptible to a deviation as compared with more conventional vehicles when the rear wheel runs into a curb stone or falls into a rut. Such a deviation in the wheel alignment could be corrected by resetting the toe angle of the rear wheels to a neutral value by using an alignment tester, but the user may not be able to detect the deviation in the wheel alignment, and could continue to operate the vehicle as it is. This would result in an improper behavior of the vehicle and a decrease in the fuel mileage of the vehicle.

The present invention was made in view of such a problem of the prior art, and has a primary object to provide a rear wheel toe angle control device and a method for calibrating a reference position of a linear electric actuator of the rear wheel toe angle control device.

Task to be Achieved by the Invention

To achieve such an object, the present invention provides, in a vehicle (V) rear wheel toe angle control device (10) that is configured to change rear wheel toe angles (δr) individually by actuating a linear electric actuator (11) provided on each rear wheel (5L, 5R), a reference position calibrating method for calibrating a reference position (S0) designated as an operational position of the electric actuators when the rear wheel toe angles are set at a neutral value (0), the method comprising: a symmetric toe angle setting step (steps S1 to S5) wherein operational positions (operational position detected value Sdtc) of the electric actuators (11) achieved when the rear wheel toe angles (δr) are symmetric to each other are set as a symmetric toe angle position (Ssym) by actuating at least one of the electric actuators in a toe out or toe in direction while the vehicle is traveling until a front wheel steering angle (δf) and a yaw rate (γ) of the vehicle have both become zero; and a subsequent reference position setting step (steps S6 to S10) wherein operational positions (Sdtc) of the electric actuators (11) achieved when an axial force (AF) acting upon each electric actuator agrees with a standard axial force (AFstd) corresponding to the neutral value of the rear wheel toe angles is set as the reference position (S0) by actuating the two electric actuators from the symmetric toe angle position (Ssym) in a toe in or toe out direction by a same amount until the axial force (AF) acting on each electric actuator (11) becomes equal to the standard axial force (AFstd).

According to a certain aspect of the present invention, in the symmetric toe angle setting step, only one of the electric actuators that causes the front wheel steering angles to be zero and the vehicle to travel straight at the same time by being actuated in the toe in direction is actuated in the toe in direction.

According to a certain aspect of the present invention, in the symmetric toe angle setting step, one of the electric actuators is actuated in the toe in direction, and the other electric actuator is actuated in the toe out direction, by a same amount.

To achieve the foregoing object, the present invention provides a rear wheel toe angle control device (10), comprising: a linear electric actuator provided on each rear wheel (5L, 5R) for varying a toe angle (δr) of the rear wheel; a reference position setting unit (22) for setting an operational position of the electric actuators (11) that causes the rear wheel toe angles (δr) to be a neutral value (0) as a reference position (S0); an operational position detecting unit (16) for detecting an operational position (operational position detected value Sdtc) of the electric actuators (11); a rear wheel toe angle detected value computing unit (23) for computing a rear wheel detected value (δrdtc) of each rear wheel according to a detection result of the operational position detecting unit (16) and the reference position (S0); a target rear wheel toe angle setting unit (21) for setting a target rear wheel toe angle (δrtgt); a drive control unit (24) for controlling an actuation of each electric actuator (11) according to the rear wheel toe angle detected value (δrdtc) and the target rear wheel toe angle (δrtgt); a symmetric toe angle position setting unit (28) for setting a symmetric toe angle position (Ssym) as the operational position of the electric actuators (11) that causes the rear wheel toe angles (δr) to be symmetric to each other; and an axial force detecting unit (17) for detecting an axial force (AF) acting on each electric actuator (11); wherein the reference position setting unit (22) resets the operational position (Sdtc) of the electric actuators (11) detected by the operational position detecting unit (16) as the reference position (S0) when the drive control unit (24) has actuated the electric actuators (11) from the symmetric toe angle position (Ssym) by an equal amount until the detected axial force (AF) has indicated that the rear wheel toe angles (δr) have reached the neutral value (0).

Effect of the Invention

Even if the operational position (rear wheel toe angle detected value) of the rear wheel as detected by a sensor should deviate from the actual operational position (actual rear wheel toe angle) due to the vehicle traveling over a bump or the like, this deviation that has occurred to the rear wheel toe angle control device can be automatically corrected, and a reduction in fuel economy and an impairment of vehicle behavior can be avoided by setting the standard operational position (standard rear wheel toe angle) according to the axial force acting on the electric actuator, and resetting the reference position according to the standard operational position. If the provisional setting of the reference position and the calibration of the reference position are performed as discussed above before the vehicle leaves the manufacturing plant, the work required for adjusting the rear wheel toe angle by using an alignment tester may be made unnecessary.

BRIEF DESCRIPTION OF THE DRAWINGS

Now the present invention is described in the following with reference to the appended drawings, in which.

DETAILED DESCRIPTION OF THE PREFERRED EMBODIMENTS

A vehicle V incorporated with a rear wheel toe angle control device embodying the present invention is described in the following with reference to the appended drawings. In the following description, each wheel and components associated therewith such as a tire and an electric actuator are denoted with a numeral with a suffix such as L and R to indicate on which side of the vehicle the particular component is located such as "rear wheel 5L" and "rear wheel 5R", and without a suffix such as "rear wheel(s) 5" when the component is referred to in a collective manner.

Figure 1:
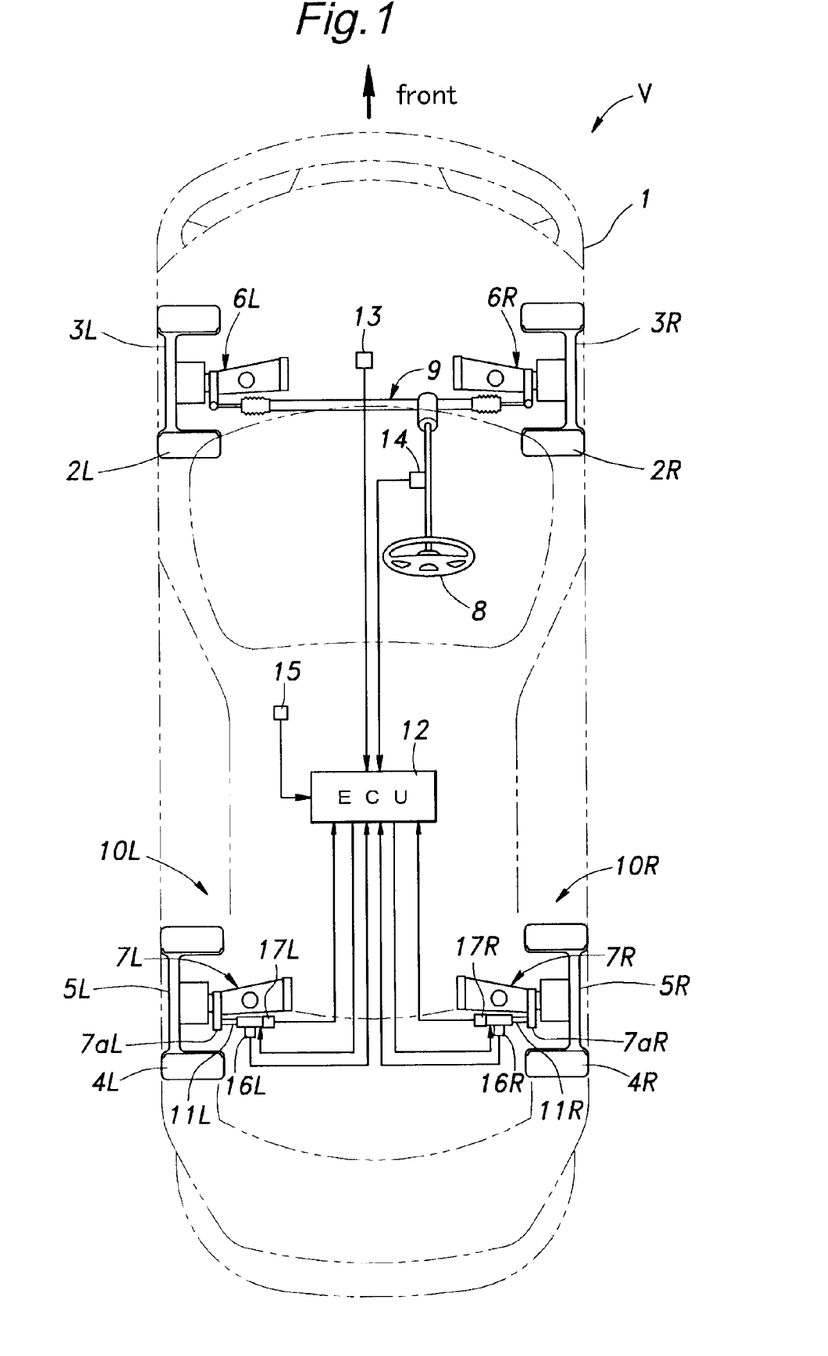
FIG. 1 is a plan view showing the overall structure of a vehicle embodying the present invention.

As shown in FIG. 1, the vehicle V is provided with front wheels 3L and 3R fitted with tires 2L and 2R, respectively, and rear wheels 5L and 5R fitted with tires 6L and 6R, and these wheels are individually supported by a vehicle body via wheel suspension devices 6L, 6R, 7L and 7R.

The vehicle V is provided with a front wheel steering device 9 including a rack and pinion mechanism that directly steers the front wheels 5L and 5R as the vehicle operator turns a steering wheel 8, and a pair of rear wheel toe angle control devices 10L and 10R each of which includes a linear electric actuator 11 connecting a knuckle 7aL, 7aR of the corresponding rear wheel suspension device 7 with the vehicle body 1 so that the toe angle δr of the rear wheel 5 may be individually varied by extending and retracting the linear electric actuator 11.

Figure 2:
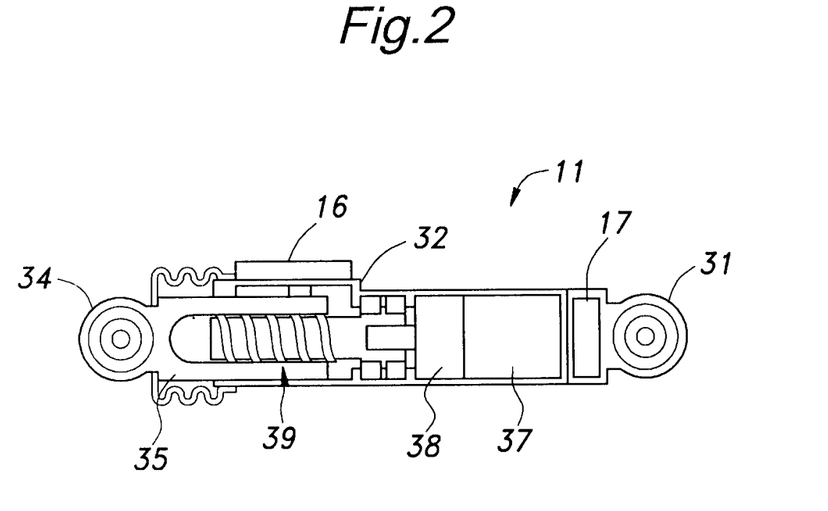
FIG. 2 is a vertical sectional view showing an electric actuator used in the embodiment of the present invention.

Referring to FIG. 2, the electric actuator 11 comprises a housing 32 including a connecting part 31 by which the housing 32 is connected to the vehicle, and an output rod 35 received by the housing 32 so as to be extended and retracted as required and provided with a connecting part 34 by which the output rod 35 is connected to the knuckle 7a. The housing 32 receives therein a brushed DC motor 37, a planetary gear reduction unit 38 and a feed screw mechanism 39 using a trapezoidal thread.

The output rod 35 is provided with a cylindrical shape, and is slidably supported by a slide bearing (not shown in the drawings) secured to the inner circumferential surface of the housing 32. The feed screw mechanism 39 is formed by a female thread formed on an inner circumferential surface of an inner bore of the output rod 35, and a male thread extending axially from the center of an output flange of the reduction unit 38 and threads with the female thread of the output rod 35. The DC motor 37 is controlled by pulse width modulation (PWM), and the rotational output thereof is transmitted to the feed screw mechanism 39 via the reduction unit 38. The feed screw mechanism 39 converts the rotational output of the DC motor 37 into a thrust movement of the output rod 35 relative to the housing 32 so that the extending and retracting movement of the electric actuator 11 is achieved.

The housing 32 of each electric actuator 11 is provided with a position sensor 16 for detecting a relative position of the output rod 35. The position sensor 16 includes a differential transformer that provides an operational position detected value Sdtc of the electric actuator 11 as an output signal according to the position of a magnet attached to an adjoining part of the output rod 35. The operational position detected value Sdtc is used for computing a rear wheel toe angle detected value δrdtc in an ECU 12.

The housing 32 is further provided with an axial force sensor 17 for detecting an axial force AF acting upon the electric actuator 11. The axial force sensor 17 detects a tensile force and compressive force acting upon the electric actuator 11 by using a strain gauge, and produces a corresponding electric detection signal. The detected axial force AF is used for calibrating a reference position S0 or the rear wheel toe angle detected value δrdtc in ECU 12 as will be described hereinafter.

Referring to FIG. 1, in addition to the ECU (electronic control unit) 12, the vehicle V is provided with a vehicle speed sensor 13 for the detecting the traveling speed of the vehicle V, a front wheel steering angle sensor 14, a yaw rate sensor 15 and other sensors not shown in the drawing. The front wheel steering angle sensor 14 detects the angular displacement of the steering wheel 8, and the front wheel steering angle δf is computed from the detected angular displacement. The yaw rate sensor 15 detects a yaw rate of the vehicle, and the yaw rate detected value γdtc thereof is used for the control of the rear wheel toe angle. The detection signal from the position sensor 16 is used for computing the rear wheel toe angle detected value δrdtc.

The ECU 1 essentially consists of a computer, and comprises a processor (CPU) for executing arithmetic operations, RAM for providing a storage area for temporarily storing various pieces of data and a work area for providing a work area for the processor, ROM for storing various pieces of data that are required for the processor to operate under a computer program and execute arithmetic processes, EEPROM for storing the results of the arithmetic operations and the part of the data from various parts of the engine that are required to be stored, various drivers, peripheral circuits and input/output interfaces. The ECU 12 is connected to the sensors 13 to 17 and the electric actuators 11 via a communication network (CAN: controller area network in the illustrated embodiment), and drives the electric actuators 11L and 11R and changes the toe angles of the rear wheels 5L and 5R according to the detection signals of the various sensors 13 to 17. In short, the ECU 12 serves as a control unit for the rear wheel toe angle control device 10.

In this vehicle V, when the left and right electric actuators 11L and 11R are actuated simultaneously in a symmetric relationship, the toe-in and toe-out of the rear wheels 5 can be freely controlled under appropriate conditions. It is also possible to steer the rear wheels 5 by extending one of the left and right electric actuators 11L and 11R and retracting the other. More specifically, with the aim of improving the driving stability of the vehicle V, according to the dynamic state of the vehicle detected from the output signals of the various sensors, the ECU 12 puts the rear wheels 5 into a toe out condition when accelerating, and puts the rear wheels 5 into a toe in condition when decelerating. The ECU 12 may also steer the rear wheels 5 in a same phase relationship to the front wheels 5 when cornering at high speed, and in an opposite phase relationship when cornering at low to medium speed.

Figure 3:
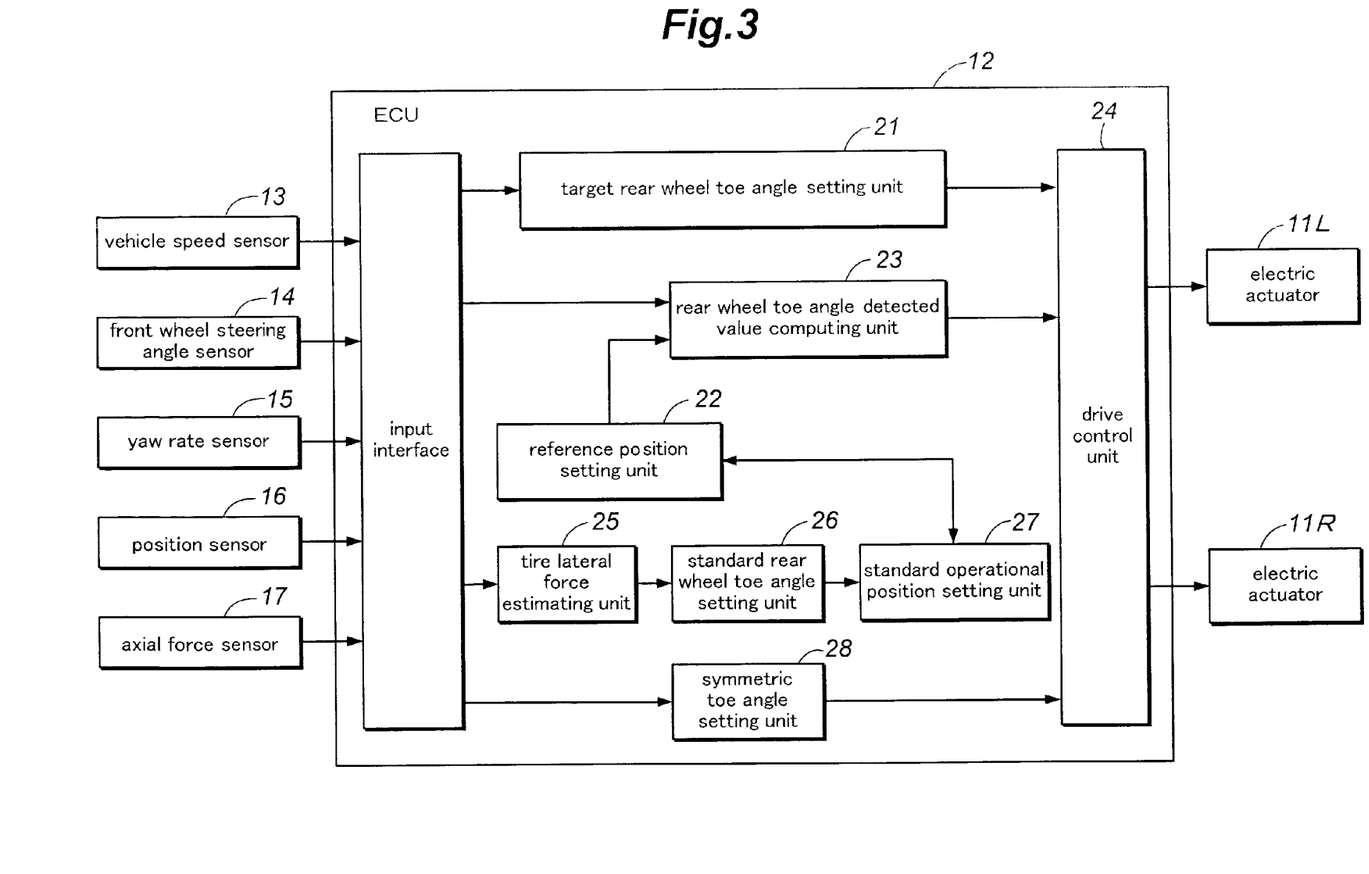
FIG. 3 is a block diagram showing the overall structure of a rear wheel toe angle control device embodying the present invention.

The functions of the ECU 12 are described in the following with reference to FIG. 3. The ECU 12 includes a target rear wheel toe angle setting unit 21, a reference position setting unit 22, a rear wheel toe angle detected value computing unit 23, a drive control unit 24, a tire lateral force estimating unit 25, a standard rear wheel toe angle setting unit 26, a standard operational position setting unit 27 and a symmetric toe angle position setting unit 28 as main components thereof.

The target rear wheel toe angle setting unit 21 sets a target rear wheel toe angle δrtgt according to the vehicle speed v and the front wheel steering angle δf received via the input interface. When setting the target rear wheel toe angle δrtgt, the target rear wheel toe angle setting unit 21 sets a yaw rate standard value γtgt according to the vehicle speed v and the front wheel steering angle δf, and performs a feedback control based on the deviation of a yaw rate detected value γdtc detected by the yaw rate sensor 15 from the yaw rate standard value γtgt.

The reference position setting unit 22 sets the operational position S of the electric actuator 11 that causes the rear wheel toe angle δr to be zero as a reference position S0, and stores therein. The reference position S0 is set as an initial position when the wheel alignment of the tire 4 is adjusted before the vehicle leaves the manufacturing plant, and is calibrated (re-adjusted) when a calibration drive control which is described hereinafter is performed. The rear wheel toe angle detected value computing unit 23 computes the rear wheel toe angle detected value δrdtc according to the difference between the operational position detected value Sdtc detected by the position sensor 16 and the reference position S0.

The drive control unit 24 performs the PWM control of the electric actuator 11 according to the difference between the target rear wheel toe angle δrtgt set by the target rear wheel toe angle setting unit 21 and the rear wheel toe angle detected value δrdtc computed by the rear wheel toe angle detected value computing unit 23. In addition to this normal rear wheel toe angle control, the drive control unit 24 performs the rear wheel toe angle control based on the calibration drive control (which will be described hereinafter) when a certain condition is met in the manufacturing plant or in normal operation, or when a command is received, for instance, from the vehicle operator by operating a prescribed switch.

Figure 4:
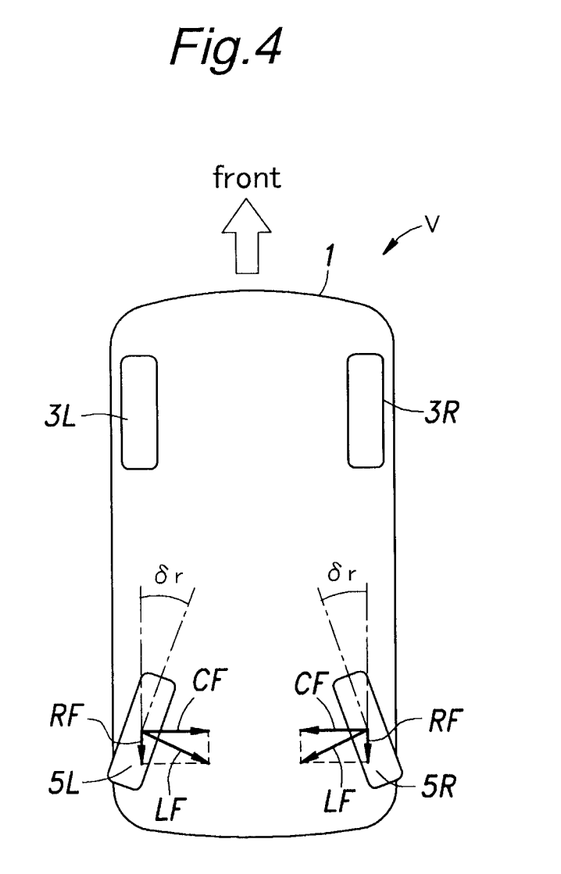
FIG. 4 is a diagram showing a tire lateral force acting on each rear wheel.
Figure 5:
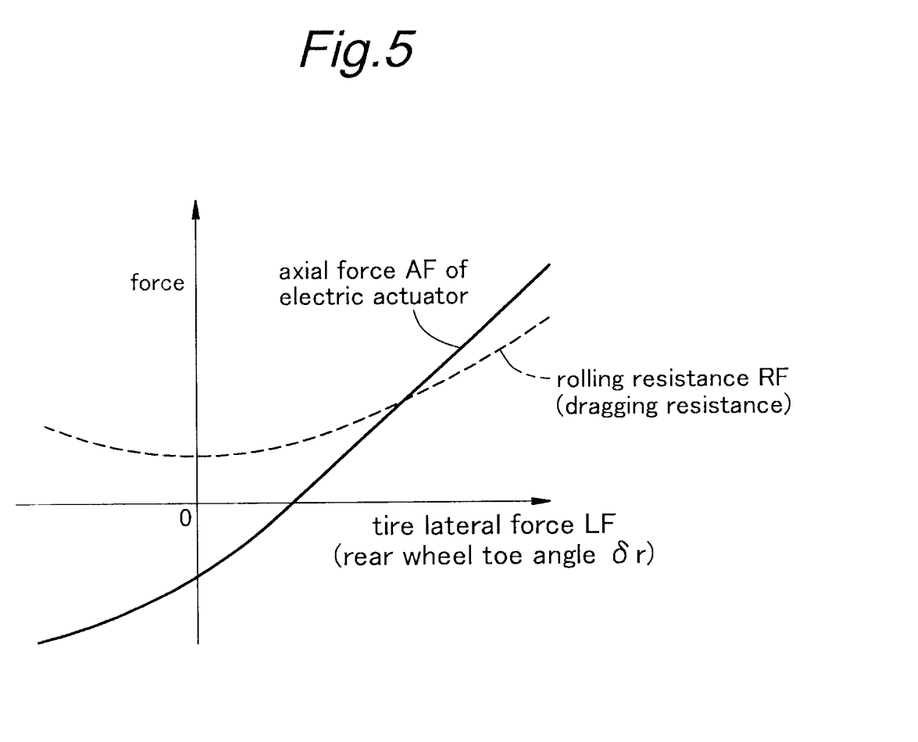
FIG. 5 is a map showing the relationship between the tire lateral force and other forces acting on the wheel.

The tire lateral force estimating unit 25 estimates the tire lateral force LF that acts upon each rear wheel 5 according to the detection signal from the corresponding axial force sensor 17. The tire lateral force LF is produced in dependence on the rear wheel toe angle δr as shown in the graph of FIG. 5. The tire lateral force LF includes a component directed in the traveling direction of the vehicle caused by the rolling resistance RF (dragging force) of the tire 4 and a component directed perpendicular to the traveling direction that acts upon the vehicle body 1 as a cornering force CF. The axial force acting on the electric actuator 11 is related with the cornering force CF in a prescribed relationship that depends on the suspension geometry of the rear wheel suspension device 7. For instance, when the imaginary king pin intersects the road surface at a point ahead of the tire contact point of the rear wheel 5 at which the cornering force is produced, and the electric actuator 11 is placed behind the imaginary king pin, the cornering force CF is directed in the same direction as the retracting direction of the electric actuator 11. When the rear wheel toe angle δr is small, as the cornering force CF and the tire lateral force LF are substantially equal to each other, the tire lateral force LF can be estimated from the axial force of the electric actuator 11 by looking up a predetermined map as shown by the dotted line in FIG. 5 relating the axial force AF of the electric actuator 11 with the cornering force CF. As shown by the broken line in FIG. 5, when the tire lateral force LF is zero or when the rear wheel toe angle δr is zero, the rolling resistance RF of the tire 4 is minimized.

The standard rear wheel toe angle setting unit 26 sets the standard rear wheel toe angle δrstd which each rear wheel should take according to the tire lateral force LF estimated by the tire lateral force estimating unit 25. The standard operational position setting unit 27 sets the standard operational position Sstd which each electric actuator 11 should take according to the standard rear wheel toe angle rstd and the reference position S0.

At the time of the calibration drive control, the symmetric toe angle position setting unit 28 sets the operational position detected value Sdtc of the electric actuators 11 as a symmetric toe angle position Ssym (at which the two rear wheel toe angles are put in a symmetric relationship) when the drive control unit 24 has driven at least one of the electric actuators 11 either in the toe out or toe in direction until the front wheel steering angle δf has become zero and the vehicle V is traveling straight. The two rear wheel toe angles are in a symmetric relationship when the two rear wheels 5 are in a toe in or toe out position at a same angle or when the two rear wheel toe angles are both zero.

Figure 6:
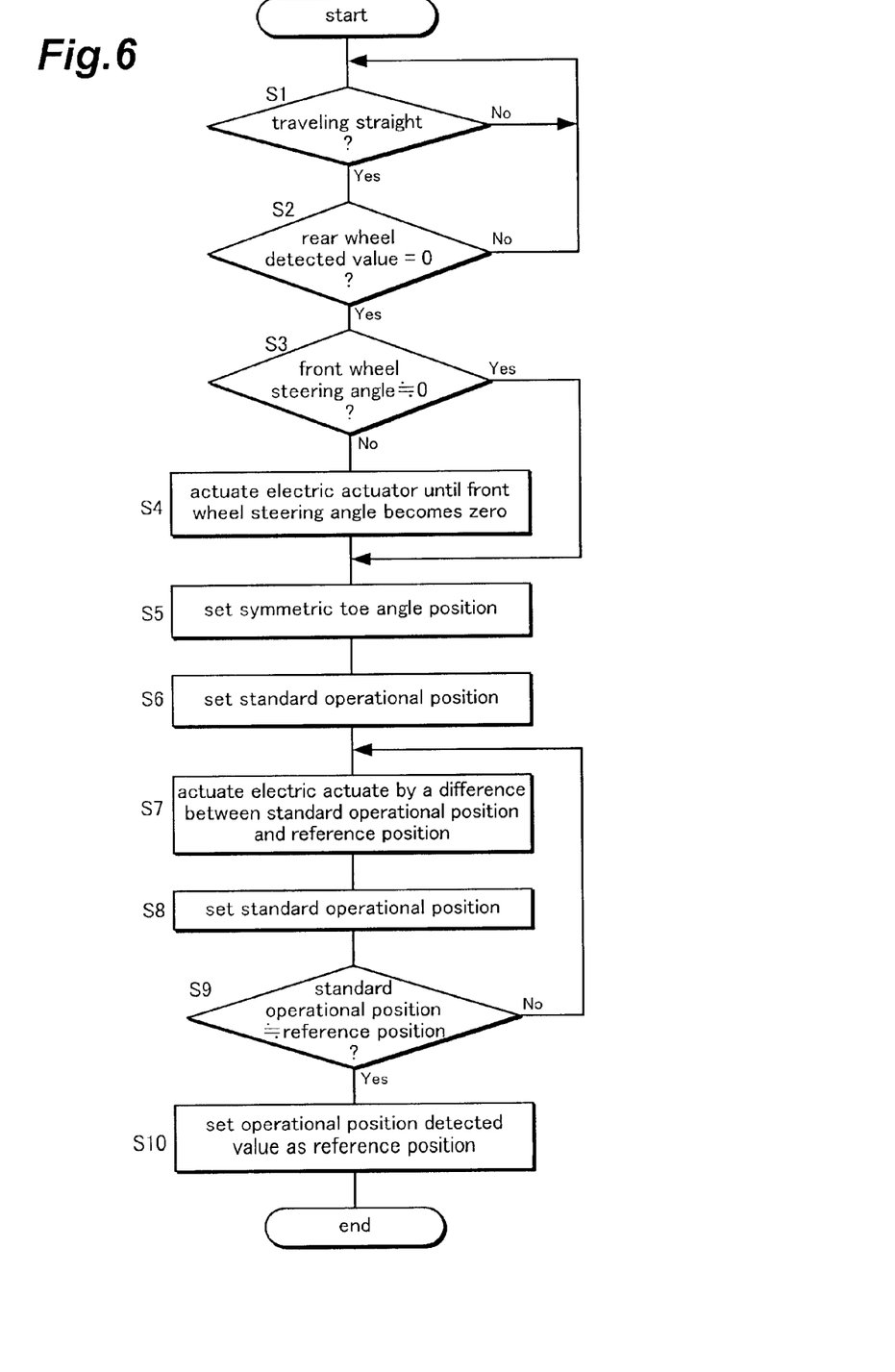
FIG. 6 is a flowchart of a calibration drive control according to the present invention.

The calibration drive control by the ECU 12 is now described in the following with reference to FIG. 6. When a command for activating the calibration drive control is entered, the ECU 12 performs the calibration drive control as given in the following. First of all, the ECU 12 determines if the vehicle is traveling straight according to the vehicle speed v and the yaw rate γ (step S1). The vehicle v is traveling straight not only when the vehicle body 1 is subjected to no yaw rate and the traveling direction coincides with the fore and aft direction of the vehicle body 1 but also when the vehicle body 1 is subjected to no yaw rate and the traveling direction does not coincide with the fore and aft direction of the vehicle body 1 or when the vehicle is traveling straight in an oblique direction. If the vehicle is determined to be traveling straight in step S1 (Yes), the ECU 12 determines if the rear wheel toe angle detected value δrdtc is zero (step S2). This process is intended to prevent the calibration drive control for the reference position S0 to be invoked or to abort the calibration drive control for the reference position S0 when the rear wheel toe angle δr is not at the neutral value or cannot be brought to the neutral value. If the determination result of step S1 or S2 is No, the aforementioned process (step S1 and the subsequent steps) is repeated.

Figure 7A:
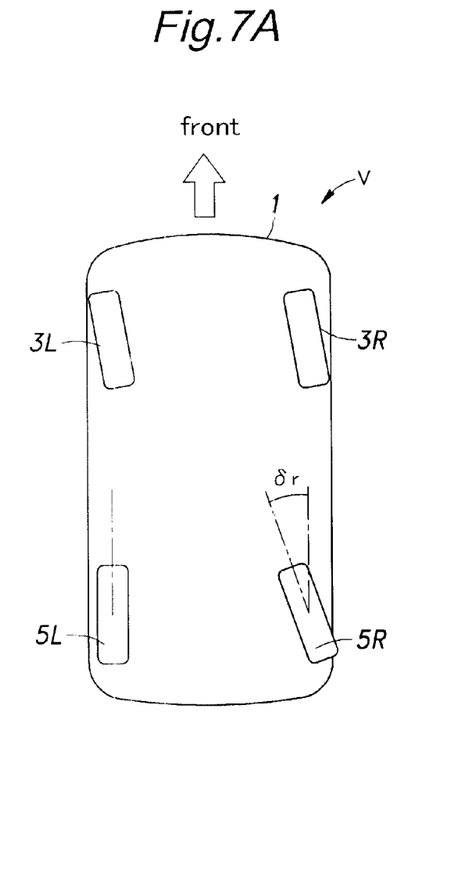
FIG. 7 is a diagram showing the mode of operation of the calibration drive control according to the present invention.

If the rear wheel toe angle detected value δrdtc is determined to be zero in step S2, the ECU 12 determines if the front wheel steering angle δf is substantially zero (step S3). This process is intended to determine if the actual rear wheel toe angles of the rear wheels are symmetric to each other. If the front wheel steering angle δf is greater than a prescribed angle even though the vehicle is traveling straight, it means that the rear wheels 5 are not steered in a symmetric relationship, and the vehicle is traveling straight in an oblique direction as shown in FIG. 7(A).

If the determination result in step S3 is No, the ECU 12 actuates the two electric actuators 11 by a same amount in a same direction until the front wheel steering angle δf becomes zero (step S4). This process is executed such that the rear wheels 5 are both steered to the right (or the left rear wheel 5L in the toe in direction and the right rear wheel 5R in the toe out direction) by a same amount and at a same rate or speed when the vehicle is traveling straight but the front wheel steering angle δf is directed to the left until the front wheel steering angle δf and the yaw rate detected value γdtc both become zero. In this manner, by appropriately actuating the electric actuators 11, the two rear wheels 5 can be put into a symmetric relationship with a minimum change in the rear wheel toe angle or without substantially affecting the dynamic behavior of the vehicle.

Figure 7B:
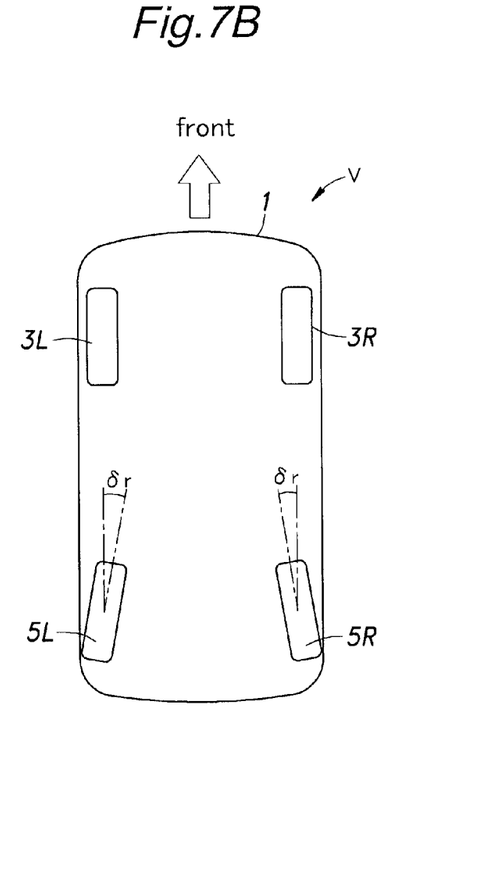

When the determination result of step S3 is Yes, or following step S4, with the rear wheel toe angles δf put into a symmetric condition as shown in FIG. 7(B), the operational position detected value Sdtc of the two electric actuators 11 detected by the position sensors 16 is set as the symmetric toe angle position Ssym that causes the rear wheel toe angles δf to be put into a symmetric condition (step S5), and the standard operational position Sstd of the two electric actuators 11 is set according to the detected axial forces AF (step S6).

Thereafter, the two electric actuators 11 are actuated by an amount corresponding to the difference between the standard operational position Sstd and the reference position S0 or the difference between the detected axial force AF and the standard axial force AFstd that should be produced when the rear wheel toe angle δr in the initial setting of the wheel alignment (step S7). More specifically, the value obtained by subtracting the standard operational position Sstd from the reference position S0 is added to the symmetric toe angle position Ssym, and this operational position is used as the target value for controlling the two electric actuators 11. Thereby, the actual rear wheel steering angle δr is reduced to zero.

The ECU 12 then sets the standard operational position Sstd anew according to the detected axial force AF (step S8), and it is determined if the standard operational position Sstd is substantially identical to the reference position S0 or the detected axial force AF is substantially identical to the standard axial force AFstd and the rear wheel toe angles δr are neural or both substantially zero (step S9). If the standard operational position Sstd is not substantially identical to the reference position S0 (No), the ECU 12 repeats step S7 and the following steps until the standard operational position Sstd has become substantially identical to the reference position S0 (step S9: Yes). Once the standard operational position Sstd has become substantially identical to the reference position S0, the ECU 12 sets the reference position S0 to the operational position detected value Sdtc obtained from the position sensor 16 (step S10) before terminating the current process.

Alternatively, in step S7, the electric actuators 11 may be actuated so that the axial force AF agrees with the standard axial force AFstd when the rear wheel toe angle δr is zero by constantly detecting the axial force AF of each electric actuator 11. In this case, steps S8 and S9 are not required.

In this manner, by changing the toe angles of the rear wheels 5 so that the standard operational position Sstd is substantially identical to the reference position S0 and setting the reference position S0 of the electric actuators 11 to the standard operational position Sstd, the reference position S0 is automatically calibrated according to the standard operational position Sstd. Thereby, even if the wheel alignment of the rear wheels should deviate from the initial setting due to the vehicle traveling over a bump or the like, this deviation can be automatically corrected. Therefore, a reduction in fuel economy and an impairment of vehicle behavior due to the increase in the rolling resistance RF of the tire 4 can be avoided. If the reference position S0 is set by using the calibration drive control before the vehicle leaves the manufacturing plant, the need for the work required for adjusting the toe angle of the rear wheels 5 by using an alignment tester can be eliminated.

Although the present invention has been described in terms of a preferred embodiment thereof, it is obvious to a person skilled in the art that various alterations and modifications are possible without departing from the scope of the present invention. For instance, the tire lateral force LF was estimated from the detection result of the axial force sensor 17, and the standard rear wheel toe angle δrstd was set according to the estimated tire lateral force LF so that the standard operational position Sstd may be set according to the thus obtained standard rear wheel toe angle δrstd in the foregoing embodiment, but it is also possible to directly set the standard operational position Sstd from the detection result of the axial force sensor 17 by looking up a map that is prepared by taking into account the various specifications of the vehicle V.

In the foregoing embodiment, the neutral value was set as zero so that the operational position S of the electric actuator 11 that causes the rear wheel toe angle δr to be zero was set as the reference position S0, and the reference position S0 was calibrated according to the standard operational position Sstd. However, the neutral value may be set as a value not equal to zero. In such a case, the operational position S of the electric actuator 11 that causes the rear wheel toe angle δr to be the neutral value may be set as the reference position S0, and the reference position S0 may be calibrated according to the standard operational position Sstd that causes the rear wheel toe angle δr to be the neutral value.

The calibration drive control was performed on the condition that the vehicle traveling straight (step S1) so that the symmetric toe angle position Ssym was set only after the front wheel steering angle δf has become substantially zero (steps S3 and S4) in the foregoing embodiment. However, it is also possible to set the symmetric toe angle position Ssym by actuating the electric actuators 11 such that the vehicle travels straight (or the yaw rate detected value γdtc is zero) with the front wheel steering angle δf fixed to zero. In this case, if the front wheel steering angle δf is zero with the rear wheel 5 placed in the state illustrated in FIG. 7(A), the rear wheel 5 applies a leftward tire lateral force LF to the vehicle body 1 and causes the vehicle V to make a right turn. Therefore, if a right turn is detected by the lateral acceleration sensor or the yaw rate sensor at such a time, the left rear wheel 5L may be steered in the toe in direction and the right rear wheel 5R may be steered in the toe out direction so as to turn the rear wheels generally in the rightward direction.

The calibration drive control of the foregoing embodiment required that the vehicle V is traveling straight and the rear wheel toe angle detected value δrdtc is zero for the execution thereof, but may additionally require that the vehicle speed v is greater than a certain prescribed value, and/or may include the yaw rate, lateral acceleration and/or fore-and-aft acceleration of the vehicle V as a prerequisite condition.

The two electric actuators 11 were actuated in step S4 in the foregoing embodiment, but it is also possible to first cause the front wheel steering angle δf to be zero by steering the rear wheel in the toe in direction, and then drive only one of the electric actuators 11 that enables the vehicle V to travel straight. For instance, when the vehicle V is traveling straight and the rear wheels 5 are placed in a state as illustrated in FIG. 7(A), the front wheels 3 are steered to the left, and the vehicle travels straight but in an oblique direction. Therefore, when a leftward front wheel steering angle δf is detected, at least one of the rear wheels 5 is required to be steered to the right to put the front wheel steering angle δf to zero so that only the left rear wheel 5L which is put into a toe in condition by being steered rightward is steered in the rightward direction. Meanwhile, when the front wheel steering angle δf is fixed to zero, and the rear wheels 5 are placed in a state as illustrated in FIG. 7(A), the vehicle V makes a right turn. Therefore, when the right turn is detected, the rear wheels 5 are required to be generally turned to the right for enabling the vehicle V to travel straight so that only the left rear wheel 5L which is put into a toe in condition by being steered to the right is steered to the right. By means of such a control action, a toe out condition of the rear wheels can be avoided under any circumstance so that the vehicle is prevented from acquiring an oversteer tendency. These and other modifications and substitutions can be made to the present invention without departing from the spirit of the present invention.

GLOSSARY 1 vehicle body
5 rear wheel
10 rear wheel toe angle control device
11 electric actuator
12 ECU
16 position sensor (operational position detecting means)
17 axial force sensor
21 target rear wheel toe angle setting unit
22 reference position setting unit
23 rear wheel toe angle detected value computing unit
24 drive control unit
25 lateral force estimating unit
26 standard rear wheel to angle setting unit
27 standard operational position setting unit
V vehicle

The invention claimed is:

1. In a vehicle rear wheel toe angle control device that is configured to change rear wheel toe angles individually by actuating a linear electric actuator provided on each rear wheel, a reference position calibrating method for calibrating a reference position designated as an operational position of the electric actuators when the rear wheel toe angles are set at a neutral value, the method comprising:

a symmetric toe angle setting step wherein operational positions of the electric actuators achieved when the rear wheel toe angles are symmetric to each other are set as a symmetric toe angle position by actuating at least one of the electric actuators in a toe out or toe in direction while the vehicle is traveling until a front wheel steering angle becomes zero and the vehicle is traveling straight; and a reference position setting step wherein operational positions of the electric actuators achieved when an axial force acting upon each electric actuator agrees with a standard axial force corresponding to the neutral value of the rear wheel toe angles is set as the reference position by actuating the two electric actuators from the symmetric toe angle position in a toe in or toe out direction by a same amount until the axial force acting on each electric actuator becomes equal to the standard axial force.

2. The reference position calibrating method in a vehicle rear wheel toe angle control device according to claim 1, wherein in the symmetric toe angle setting step, one of the electric actuators is actuated in the toe in direction, and the other electric actuator is actuated in the toe out direction, by a same amount.

3. The reference position calibrating method in a vehicle rear wheel toe angle control device according to claim 1, wherein in the symmetric toe angle setting step, only one of the electric actuators that causes the front wheel steering angles to be zero and the vehicle to travel straight at the same time by being actuated in the toe in direction is actuated in the toe in direction.

4. A rear wheel toe angle control device, comprising:

a linear electric actuator provided on each rear wheel for varying a toe angle of the rear wheel;

a reference position setting unit for setting an operational position of the electric actuators that causes the rear wheel toe angles to be a neutral value as a reference position;

an operational position detecting unit for detecting an operational position of the electric actuators;

a rear wheel toe angle detected value computing unit for computing a rear wheel detected value of each rear wheel according to a detection result of the operational position detecting unit and the reference position;

a target rear wheel toe angle setting unit for setting a target rear wheel toe angle;

a drive control unit for controlling an actuation of each electric actuator according to the rear wheel toe angle detected value and the target rear wheel toe angle;

a symmetric toe angle position setting unit for setting a symmetric toe angle position as the operational position of the electric actuators that causes the rear wheel toe angles to be symmetric to each other; and an axial force detecting unit for detecting an axial force acting on each electric actuator;

wherein the reference position setting unit resets the operational position of the electric actuators detected by the operational position detecting unit as the reference position when the drive control unit has actuated the electric actuators from the symmetric toe angle position by an equal amount until the detected axial force has indicated that the rear wheel toe angles have reached the neutral value.

* * * * *